United States Patent Office 3,264,216
Patented August 2, 1966

3,264,216
MULTIFUNCTIONAL VISCOSITY INDEX IM-
PROVERS FOR LUBRICATING OILS
Jack Rockett, Westfield, N.J., assignor to Esso Research
and Engineering Company, a corporation of Delaware
No Drawing. Filed Sept. 26, 1962, Ser. No. 226,470
4 Claims. (Cl. 252—56)

The present invention relates to oil-soluble copolymer products embodying, as a sludge dispersancy component, an alkylene ether and more particularly an allyl ether or vinyl ether derivative.

The use of polymeric materials for imparting viscosity index improving and pour point depressant properties to lubricating oil compositions has been well known for some time. More recently it has been found desirable to modify such polymeric materials so that they will also function as detergent additives and sludge dispersants. The need for detergents and sludge dispersants in lubricating oils, particularly those employed as crankcase lubricants, has long been recognized. These agents serve the function of preventing the accumulation of carbonaceous and/or varnish-like deposits on the various internal parts of the engine, and they also serve to hold in suspension any sludge that may be formed in the engine. They are particularly valuable in lubricants used under conditions of stop-and-go driving, where engines are prone to accumulate deposits of sludge and pistons to become coated with varnish.

Heretofore, detergency has been obtained in lubricating oil compositions by incorporating therein metal-containing additives such as alkaline earth metal organic sulfonates, metal alkyl phenates, or the like. Such additives have a disadvantage in high performance internal combustion engines, however, in that they promote the formation of ash residues in the combustion chamber, leading to preignition, spark plug fouling, valve burning, and similar deleterious conditions. Hence, detergent and dispersant additives for crankcase lubricants that are either ash free or are relatively low in ash-forming tendencies are particularly desirable. Still more advantageous are metals-free additives having multifunctional characteristics, i.e. those that furnish viscosity index improving and pour point depressing properties as well as detergency and dispersancy.

Ash-free detergent additives can be used not only in compositions where all of the components are ash-free but may also be used in conjunction with metals-containing additives where it is desired to boost the detergent effect without increasing the overall metal content of the lubricating oil.

In accordance with the present invention, it has been found that lubricating-oil-soluble additives that are particularly effective as detergents and dispersants can be prepared by copolymerizing certain alkylene ethers, these being more particularly certain allyl ether and vinyl ether compounds, with oil-solubilizing monomers. The alkylene ether compounds are highly polar, which accounts for their detergent and dispersant properties. Being highly polar they are relatively oil-insoluble and it is necessary to copolymerize them with nonpolar monomers to impart mineral oil solubility.

The nonpolar monomers that may be used as components of the copolymers of the present invention include: $C_2$ to $C_{20}$ aliphatic esters of alpha, beta-unsaturated dicarboxylic acids, such as oleyl fumarate, octadecyl maleate, octyl itaconate, and the like; and alkylene esters of short chain fatty acids, such as vinyl acetate, allyl propionate, isopropenyl acetate, vinyl butyrate, and the like.

The vinyl ether or allyl ether component of the copolymer is represented by the formula

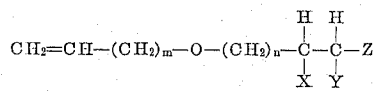

wherein $m$ and $n$ have values of zero to one;
X and Y are selected from the group consisting of hydroxy radicals and epoxy oxygen common to X and Y; and Z is hydrogen.

Thus the allyl ether may be allyl glycidyl ether

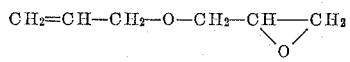

or its hydrolysis product, 1-allyloxy-2,3-dihydroxypropane $$CH_2=CH-CH_2-O-CH_2-CHOH-CH_2OH$$

Where the copolymers of the invention are primarily intended as mineral oil dispersants and detergents the molar proportions of the polar monomers to the nonpolar monomers may be employed within the following broad and preferred ranges:

|  | Mole Percentages | |
| --- | --- | --- |
|  | Broad Range | Preferred Range |
| Polar Monomers | 10 to 75 | 25 to 50 |
| Nonpolar Monomers | 25 to 90 | 75 to 50 |

If the copolymers are to be used as multifunctional additives wherein viscosity index improving properties are also desired, then a higher proportion of nonpolar monomers must be present, i.e. from 85 to 99 mole percent.

Particularly effective multifunctional additives having potent viscosity index improving properties as well as a high degree of detergency and dispersancy are prepared by copolymerizing the polar allyl ether and/or vinyl ether compounds of the present invention with two types of unsaturated esters, one ester being an ester of a $C_8$ to $C_{20}$ aliphatic alcohol and an alpha, beta-unsaturated dicarboxylic acid, and the other ester being an alkylene ester of a short chain fatty acid. The preferred alpha, beta-unsaturated dicarboxylic acid is fumaric acid, although maleic acid or itaconic acid may be used. The alkylene esters include vinyl, isopropenyl and allyl esters of acetic, propionic and butyric acids.

The broad and preferred ranges of molar proportions of the monomers employed in preparing these particular tripolymers of the invention are as follows:

|  | Mole Percentages | |
| --- | --- | --- |
|  | Broad Range | Preferred Range |
| Polar allyl ether or vinyl ether compound | 1–10 | 2–5 |
| Aliphatic ester of alpha, beta-unsaturated dicarboxylic acid | 15–50 | 20–30 |
| Alkylene ester of short chain fatty acid | 50–85 | 70–80 |

Specific examples of aliphatic alcohol esters of alpha, beta-unsaturated dicarboxylic acids that may be employed include oleyl fumarate, octyl itaconate, octadecyl maleate, lauryl fumarate, lauryl maleate, tallow fumarates or maleates and $C_8$ or $C_{13}$ oxo fumarate. Esters of glycol monoalkyl ethers and fumaric, maleic or itaconic acid may also be used, such as Cellosolve fumarate (glycol monoethyl ether fumarate). By tallow fumarates or maleates is meant the esters of fumaric acid or maleic acid and the alcohols derived by hydrogenation of tallow. The latter are principally $C_{16}$ and $C_{18}$ alcohols, with minor amounts of $C_{12}$, $C_{14}$ and $C_{20}$ alcohols. The oxo alcohols are well known in the art and are prepared from olefins by reaction with carbon monoxide and hydrogen in the presence of a suitable catalyst such as one containing cobalt, e.g. a cobalt carbonyl. The reaction products are primarily aldehydes having one more carbon atom than the starting olefins. These aldehydes are then hydrogenated in a separate catalytic stage to convert them to the corresponding alcohols.

The copolymers of the present invention may be prepared by any well-known polymerization process, including low temperature Friedel-Crafts polymerization, ionic polymerization processes or radiation polymerization processes. Free radical catalysts, for example peroxide-type catalysts, are particularly useful. These include benzoyl peroxide, acetyl peroxide, urea peroxide, and tertiary butyl perbenzoate. A hydro peroxide or an azo-catalyst such as alpha,alpha'-azo-bis-isobutyronitrile may be used. These catalysts may be employed in concentrations in the range of from about 0.01 to about 2 weight percent. The polymerization may be carried out in a suitable solvent in order to control reaction velocity and molecular weight. Oxygen may be excluded during the polymerization by the use of a blanket of an inert gas such as nitrogen or carbon dioxide. Solvents include benzene, heptane, mineral oil or other suitable organic solvent, and temperatures may range from about 167 to about 230° F. and reaction times may vary from about 3 to 7 hours. Depending upon the type of copolymer and its end use, the final copolymer may have a molecular weight in the range of from about 5000 to about 600,000 or higher. The molecular weight can be determined by measuring the viscosity of solutions containing 5 milligrams of the copolymer per cc. in diisobutylene and applying the Staudinger equation. Molecular weights of from about 100,000 to about 500,000 are particularly preferred for V.I. improving polymers, with a broader range encompassing molecular weights of from about 50,000 to 600,000. Copolymers intended primarily as detergent additives and incorporating higher mole ratios of polar monomers may have somewhat lower molecular weights, e.g. 10,000 to 50,000.

Upon completion of the polymerization reaction the copolymer may be free of solvent and employed as an additive for lubricating oils or for fuel oils. For convenience in blending at the termination of the polymerization, the polymer may be diluted with a light mineral oil and then stripped of solvent and unconverted monomers to give a concentrate of the polymer.

For use as lubricating oil additives, the copolymers of the invention may be incorporated in lubricating oil compositions in concentration ranges of from about 0.1 to about 10 weight percent. The lubricating oils to which the additives of the invention may be added include not only mineral lubricating oils but various synthetic oils. The mineral lubricating oils may be of any preferred type, including those derived from the ordinary paraffinic, naphthenic, asphaltic, or mixed base mineral crude oils by suitable refining methods. Synthetic hydrocarbon lubricating oils may also be used. Other synthetic oils include dibasic acid esters such as di-2-ethylhexyl sebacate, carbonate esters, glycol esters such as $C_{13}$ oxo acid, diesters of tetraethylene glycol, and complex esters as for example the complex ester formed by the reaction of 1 mole of sebacic acid with 2 moles of tetraethylene glycol and 2 moles of 2-ethylhexanoic acid.

The copolymers of the invention may also be employed in middle distillate fuels for inhibiting the formation of sludge and sediment in such fuels. When so employed they will be used in concentrations of from about 0.002 to about 2 weight percent. Preferred concentrations in such instances are from about 0.005 to about 0.1 weight percent. Petroleum distillate fuels boiling in the range from about 300° F. to about 900° F. are contemplated. Typical of such fuels are No. 1 and No. 2 fuel oils meeting ASTM Specification D–396–48T, diesel fuels qualifying as grades 1D, 2D and 4D of ASTM Specification D–975–51T, and jet engine fuels such as those covered by U.S. Military Specification MIL–F–5624C.

In either the fuel or lubricant compositions, other conventional additives may also be present, including dyes, antioxidants, antiwear agents, and other dispersants.

When the copolymers of this invention are employed for their detergent and dispersant functions they may be used as the sole detergent agents in the lubricating oil compositions or they may be used as boosters for conventional detergents. Thus it is possible to employ them in conjunction with metals-containing additives to obtain enhanced detergency without materially increasing the total ash-forming properties of the composition. Conventional metals-containing detergents, dispersants or detergent-inhibitors include: alkaline earth metal salts of alkylated phenols or of alkylated phenol sulfides, e.g. Ba nonyl phenol sulfide; alkaline earth metal sulfonates, particularly the so-called basic salts, e.g. overbased calcium petroleum sulfonate; colloidal complex dispersions of barium carbonate or calcium carbonate in mineral oils containing oleophilic surfactants, e.g. the reaction product of barium hydroxide and $CO_2$ in the presence of a sulfurized polyolefin or of a metal sulfonate; and the like.

The following examples serve to illustrate the manner in which the present invention may be practiced and the advantages accruing from the use of the copolymers of the invention.

*Example 1*

The compound, 1-allyloxy-2,3-dihydroxypropane, was synthesized as follows:

In a 500 cc. flask were placed 57.0 g. (0.5 mole) of allyl glycidyl ether, 150 cc. of water, and 3.4 cc. of concentrated hydrochloric acid. This mixture was heated under reflux for four hours. The solution was neutralized with aqueous sodium hydroxide to a pH of 8.0 and the water was distilled off under reduced pressure. The residue remaining after removal of the water was dissolved in ether and dried over anhydrous sodium sulfate. The ether solution was filtered and distilled, leaving behind 57.9 g. of a clear colorless oil (0.437 mole) constituting an 87.5% yield.

*Analysis.*—Calculated for $C_6H_{12}O_3$: C, 54.5; H, 9.1%. Found: C, 53.36; H, 9.01%.

*Example 2*

The polar monomer obtained in Example 1 was incorporated into an oil-soluble polymer, as follows:

In a 2-liter flask were placed 143.4 g. of di-tallow fumarate, and 191.6 g. of di-octyl fumarate. The mixture was heated and stirred in a nitrogen atmosphere until melted. A solution of 14.7 g. of the allyloxy dihydroxypropane of Example 1 in 192.2 g. of vinyl acetate, plus 2.2 cc. of tertiary butyl peroxide was added when the temperature had reached 93° C. The reaction mixture was kept at 84–90° for five hours, during which time it thickened to a viscous oil. Analysis at the completion of this period showed no unreacted fumarate ester to be present.

*Example 3.—Preparation of oil-soluble copolymer containing allyl glycidyl ether*

In a 2-liter flask were placed 143.4 g. (0.234 mole) of di-tallow fumarate, and 191.6 g. (0.564 mole) of di-isooctyl fumarate. These were heated to 93° C. in a nitrogen atmosphere and then a solution of 192.2 g. (2.235 moles) of vinyl acetate, 12.7 g. (0.1113 mole) of allyl glycidyl ether, and 2.2 cc. of tertiary butyl perbenzoate was added. The reaction mixture was stirred at 85–90° in a nitrogen atmosphere until analysis showed that virtually all of the unreacted fumarate had disappeared. The polymer was dissolved in 500 cc. of a mineral oil to give a 34.1% polymer solution.

*Example 4*

The polymer concentrates of Examples 2 and 3 were each blended in a lubricating oil base stock at a 2% polymer concentration, and the viscosities and viscosity indexes of each blend and of the base oil were determined. The viscosity index improving properties of the polymers are shown in Table I. The base oil was a mixture of 60 weight percent of solvent refined mineral oil of 100 SSU viscosity at 100° F., 35 weight percent of solvent refined mineral oil of 400 SSU viscosity at 100° F. and 5 weight percent of commercial antiwear and detergent additive concentrates.

TABLE I

|  | Viscosity at 210° F. | Viscosity Index |
|---|---|---|
| Base Oil | 47.2 | 111.9 |
| Base Oil Plus Example 2 Polymer | 68 | 141 |
| Base Oil Plus Example 3 Polymer | 72.1 | 142.4 |

*Example 5*

The polymer of Example 2 was employed as a booster detergent in a low temperature engine test in which conditions were intended to simulate stop-and-go driving. A six-cylinder Ford engine was used, charged with 4 quarts of the oil under test, and run for a total of 240 hours.

At the end of the first 55 hours, and every 44 or 55 hours thereafter, the engine was inspected by removing the oil pan, the rocker arm cover, and the push rod chamber cover, and various parts including the oil screen, the oil pan, the crankshaft, the push rod chamber, the push rod chamber cover, the rocker arm cover, and the rocker arm assembly, were rated for sludge deposition, using a merit system in which 10 represents a clean part and zero a part covered with the maximum amount of sludge possible.

The test oil consisted of 88.8 weight percent of a solvent neutral mineral oil of 170 SSU viscosity at 100° F., 1.0 weight percent of a zinc dialkyl dithiophosphate wear reducing additive, 3.5 weight percent of a commercial detergent-inhibitor and 6.7 weight percent of the polymer concentrate of Example 2, which supplied 2 weight percent of actual copolymer.

The detergent-inhibitor used in the test may be characterized as a colloidal complex of phosphosulfurized hydrocarbons, barium alkyl phenate and barium carbonate in mineral oil, prepared by reacting a polyisobutylene of about 940 molecular weight with 15 weight percent $P_2S_5$, mixing the product with nonyl phenol and mineral oil and reacting the mixture with barium hydroxide and carbon dioxide at 250–300° F. for 6 to 10 hours to form a product having a representative weight percent composition as follows:

| | Percent |
|---|---|
| Phosphosulfurized polyisobutene | 27.0 |
| Alkyl phenol (248 average molecular weight) | 11.7 |
| Barium oxide | 10.6 |
| Carbon dioxide | 2.5 |
| Mineral oil | 48.2 |

The overall merit ratings are given in Table II.

TABLE II

| Time, Hours | Engine Merit Rating | Percent Oil Screen Plugged |
|---|---|---|
| 55 | 9.99 | 0 |
| 99 | 9.95 | 0 |
| 143 | 9.8 | 0 |
| 198 | 9.7 | 0 |
| 242 | 7.0 | 0 |

The examples presented in the foregoing specification are not intended to limit the scope of this invention in any manner but are given merely to illustrate the invention. The scope of the invention is not to be limited by any theory regarding its operation. The invention is defined by the claims appended hereto.

What is claimed is:

1. A hydrocarbon oil composition comprising a major proportion of a hydrocarbon oil and from about 0.002 to about 10 wt. percent of an ash-free, oil-soluble multifunctional additive having V.I. improving and detergency properties comprising a copolymerization product having a molecular weight within the range of about 5,000 to about 600,000, of about 70 to 80 mole percent of vinyl alcohol ester of $C_2$ to $C_4$ fatty acid, about 20 to 30 mole percent of diester of alpha, beta-unsaturated $C_4$ dicarboxylic acid and $C_8$ to $C_{20}$ saturated aliphatic alcohol, and about 2 to 5 mole percent of ether selected from the group consisting of alkylene ethers of the formula:

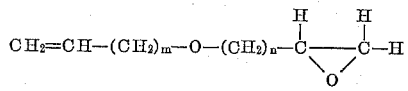

wherein $m$ is 0 to 1, and $n$ is 1; and hydrolysis products of said alkylene ethers.

2. A hydrocarbon oil composition as defined by claim 1 wherein said hydrocarbon oil is a lubricating oil, said vinyl alcohol ester is vinyl acetate, and said alpha, beta-unsaturated dicarboxylic acid is fumaric acid.

3. A hydrocarbon oil composition as defined by claim 2 wherein said ether is allyl glycidyl ether.

4. A hydrocarbon oil composition as defined by claim 2 wherein said ether is the hydrolysis product of allyl glycidyl ether.

References Cited by the Examiner

UNITED STATES PATENTS

| 2,403,792 | 7/1946 | Engelke | 252—46.6 |
| 2,687,405 | 8/1954 | Rothrock et al. | 260—86.1 |
| 2,781,335 | 2/1957 | Cupery | 260—78.4 |
| 2,788,339 | 4/1957 | Rothrock et al. | 260—85.7 |
| 2,839,514 | 6/1958 | Shokal et al. | 260—80.5 |
| 2,897,200 | 7/1959 | Maeder et al. | 260—80.5 |
| 2,960,523 | 11/1960 | O'Brien | 252—46.6 |
| 3,135,714 | 6/1964 | Sterling et al. | 260—86.1 |
| 3,166,504 | 1/1965 | Krukziener et al. | 252—46.6 |

DANIEL E. WYMAN, *Primary Examiner.*

L. G. XIARHOS, *Assistant Examiner.*